Patented July 14, 1953

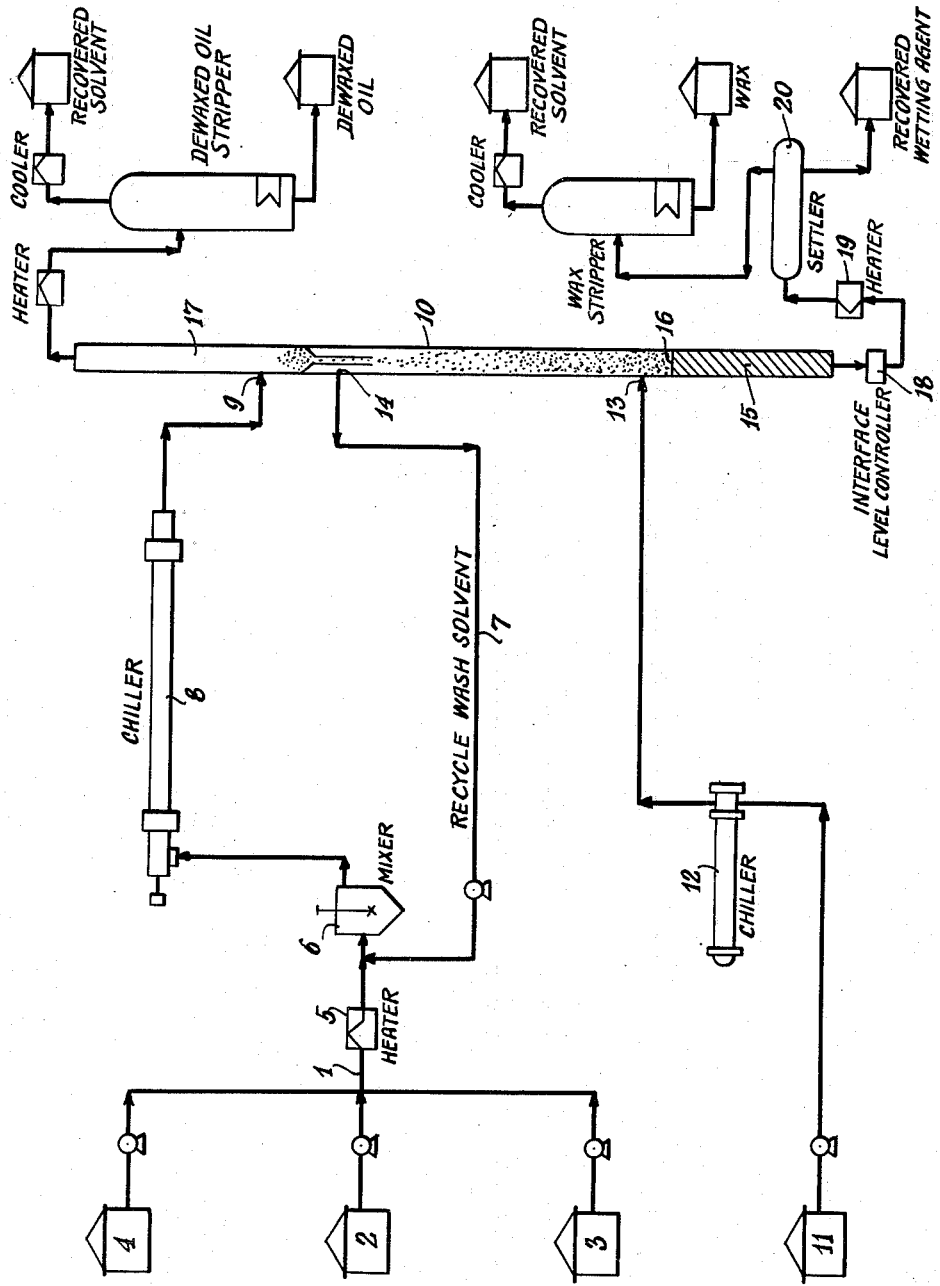

2,645,597

UNITED STATES PATENT OFFICE 2,645,597

PROCESS FOR SEPARATING WAX FROM WAX-OIL MIXTURES

Harold C. Myers and Arnold O. Pukkila, Woodbury, and Theodor A. Petry, Wenonah, N. J., assignors to Socony-Vacuum Oil Company, Incorporated, a corporation of New York Application July 28, 1949, Serial No. 107,318

13 Claims. (Cl. 196—18)

This invention relates to the separation of wax from wax-oil mixtures or solutions of wax in oil, and is more particularly concerned with a process for dewaxing wax-containing hydrocarbon fractions. More specifically, the present invention provides a gravity method for separating wax or oil from wax-oil mixtures or from solutions of wax in oil.

As is well known to those familiar with the art, various methods of dewaxing wax-containing hydrocarbon fractions have been proposed and several of them are being utilized in the petroleum industry. These methods fall into three main categories which, for convenience, may be enumerated as follows:

1. Filter press dewaxing of low-viscosity wax-containing oils with or without dilution with a suitable diluent or solvent.
2. Centrifuge dewaxing of high-viscosity wax-containing oils diluted with a suitable diluent or solvent.
3. Solvent dewaxing of low- or high-viscosity wax-containing oils A. Employing filtration for separating wax and oil,
B. Employing centrifugation for separating wax and oil.

Filter press dewaxing of low-viscosity wax-containing oils comprises chilling a wax-containing hydrocarbon fraction having a S. U. V. of about 75-80 seconds at 100° F. to a temperature slightly below that at which the dewaxed hydrocarbon fraction should flow and, thereafter, subjecting the thus chilled hydrocarbon fraction to a filter pressing operation to separate, from the hydrocarbon fraction, the crystalline wax which has precipitated during the chilling operation. Filter press dewaxing is frequently employed in conjunction with naphtha as a diluent for the stock to be dewaxed, especially when high wax-content stocks are being processed or when low oil-content waxes are desired. However, filter press dewaxing is not applicable to the treatment of heavy oils. This is due to the difficulty of filtering oil through the cake formed by the fine crystals of ceresin waxes present in these heavy oils.

Centrifuge dewaxing comprises passing continuously a chilled solution of residual oil in naphtha through a centrifuge revolving at about 17,000 R. P. M., separating the oil and wax streams, and subsequently, removing the solvent naphtha therefrom. Centrifuge dewaxing is generally applicable to the treatment of residual oils. This is due to the large crystal structure and the resulting poor flow characteristics of the paraffinic waxes present in low-viscosity oils. However, with suitable modifications, centrifuge dewaxing can be applied to the processing of distillate oils. Moreover, centrifuge dewaxing has the disadvantage of producing high oil-content waxes, and oils which, on standing, sometimes develop wax clouds due to ineffectual dewaxing of the wax-containing residual oil.

The availability of new solvents having given desired characteristics at moderate cost has led to the development of numerous types of solvent dewaxing processes. In general, in these processes, the wax-containing oil is mixed with prescribed amounts of a solvent or diluent and the mixture is chilled to a predetermined temperature. The chilled mixture is then subjected either to a filtering operation or to a centrifuging operation to separate from the oil the wax which has precipitated during the chilling operation. Finally, the solvent is stripped from the wax and from the dewaxed oil.

The benzol-ketone dewaxing process is typical of these solvent dewaxing processes, and probably, is the most extensively used in the petroleum industry for dewaxing both low- and high-viscosity wax-containing oils and for deoiling the waxes thus obtained in rerun processing. In this process, waxy oil or oily wax admixed with a solvent containing about 40 per cent methylethyl ketone, 52 per cent benzol, and 8 per cent toluol, in a proportion of about 1:3, is chilled to the dewaxing or deoiling temperature by exchange with outgoing products and by refrigeration. Oily and waxy materials are separated by employing a rotary drum-type filter and each is subsequently stripped free of solvent. Dewaxing operations are carried out at temperatures of about minus 30° F. to about plus 20° F., while wax deoiling operations are performed at temperatures as high as 100° F. Generally, dewaxing temperatures are about 20° F. lower than the pour point of the finished oil.

Another widely used solvent dewaxing process is the propane dewaxing process. Propane dewaxing differs from other solvent dewaxing processes in that a liquefied hydrocarbon is utilized in pressure equipment. Chilling to temperatures about 30-40° F. lower than the pour point of the finished oil is effected by self-evaporation of the propane combined, when desirable, with extraneous refrigeration. Filtration is performed with rotary or leaf-type pressure filters. The proportions of solvent to oil are similar to those employed in the benzol-ketone process and the dewaxing or deoiling temperatures vary from about minus 40° F. to about plus 100° F.

Other solvent dewaxing methods such as the Separator-Nobel and Bari-Sol dewaxing processes, utilize centrifuges for separating oil and wax from solvent-diluted wax-containing oils. The former process employs trichloroethylene as the solvent while the latter utilizes a mixture of benzene with ethylene dichloride as the solvent. In general, the dewaxing or deoiling temperatures are about 20° F. lower than the desired pour point of the dewaxed oil. Solvent-to-oil ratios may be as high as 8:1.

More recently, new processes for dewaxing wax-containing mineral oils have been proposed. In general, in these processes, waxy oil is dispersed and/or emulsified in various aqueous and/or non-aqueous media, the dispersion or emulsion is then chilled, and, subsequently, oil is leached from the dispersion or the emulsion.

It is well known that there are numerous disadvantages associated with current methods of dewaxing wax-containing distillate stocks and residual oil stocks. These disadvantages may be classified into two main groups, i. e., those of an operating nature and those of an economic nature. Accordingly, any process which substantially eliminates the inherent technological difficulties and minimizes the operating costs of the processes of the prior art is manifestly highly desirable.

It has now been found that it is possible to effect dewaxing of wax-containing distillate stocks and residual oil stocks in a more efficient, relatively simpler and more economical manner. It has now been discovered that the foregoing can be achieved through the application of a procedure utilizing a mechanism whereby wax is removed from a dewaxed oil-solvent solution by gravity separation, wax being deoiled subsequently.

Accordingly, it is a broad object of the present invention to provide a process for separating wax or oil from wax-oil mixtures or from solutions of wax in oil. Another object is to provide a gravity separation method for separating wax or oil from wax-oil mixtures or from solutions of wax in oil. A further object is to effect dewaxing of wax-containing distillate and residual oils which is efficient, economical, and relatively simple. A very important object is to afford an accelerated gravity separation process for effecting dewaxing and wax deoiling of wax-containing oils and of oil-containing waxes, respectively.

Other objects and advantages of the present invention will become apparent to those skilled in the art from the following description taken in conjunction with the drawing showing a diagrammatic illustration of a plant for practicing the process of the present invention.

It is well known in the art that gravity separation of wax from dewaxed oil-solvent solutions occurs at very slow rates, even when utilizing high-gravity solvents. These rates are of such small magnitude as to preclude any commercial application of dewaxing procedures embodying this method of separation. The rates become especially poor, from the standpoint of commercial feasibility, when it is attempted to process distillate oil stocks containing large, interlocking paraffin wax crystals.

In view of the foregoing and for the purposes of the present invention, it is postulated that the slow rates referred to are attributable to both the crystal habit of waxes and the probable occlusion of dewaxed oil or oil-solvent solution therein, thereby preventing the wax crystals from settling in accordance with their true gravity. In accordance with the present invention, these difficulties are overcome through the conjoint use of surface active agents such as will be defined in more detail hereinafter, and of non-freezing aqueous solution. It is envisaged that the conjoint use of these materials accomplishes the following:

1. Reduces appreciably the occlusion of dewaxed oil or oil-solvent mixture in the wax product;
2. Contributes to an increase in the difference between the effective specific gravity of the dewaxed oil or oil-solvent mixture and the effective specific gravity of the wax; and
3. Promotes the agglomeration of the wax crystals in the oil or oil-solvent mixture;

through the attachment of the non-freezing aqueous solution to the wax crystal surfaces in the presence of oil or oil-solvent mixtures. The thus separated wax crystals can be washed with fresh solvent to remove residual oil or they can be washed with non-freezing aqueous solution to remove entrained oil thereby conserving wash solvent.

For the primary purpose of providing a more complete understanding of the scope of the present invention, but without any intent of limiting the same, the mechanism whereby wax crystal surfaces are wetted by the non-freezing aqueous solution, in the presence of oil or of oil-solvent mixtures, stripped to its essentials, may be postulated to be as follows: In general, a surface active agent is considered to be a compound, usually an organic compound, one extremity of a molecule of which is polar in nature, in this instance, hydrophilic or oil-repellent, while the other is non-polar in nature, in the present case, hydrophobic or water-repellent. Since wax is essentially oily in character, it follows that with respect to the non-polar end of a molecule of a surface active agent, there will be competition between wax and oil or between wax and an oil-solvent mixture. Conceivably, a surface active agent can be chosen or prepared, a molecule of which possesses a non-polar end which is more avid for wax than for oil or for an oil-solvent mixture. Therefore, in a system consisting of a wax phase dispersed in an oil or an oil-solvent phase, the molecules of such a surface active agent will adsorb at the wax-oil or wax-oil-solvent mixture interfaces. This, in effect, means that the wax surfaces are coated, at least in part, with an oil-repellent film. Hence, when water or an aqueous solution is added to the system as a third phase, water or the aqueous solution becomes attached to the wax surfaces. The resulting system then will consist of wax particles at least partially covered with water or aqueous solution dispersed in a continuous oil or oil-solvent phase. The result is that the effective gravity of the wax particles is changed appreciably.

In normal gravity separation of wax from dewaxed oil-solvent solution, separation occurs by motion of the wax particles, with respect to the dewaxed oil or oil-solvent solution, induced by a difference between the specific gravities of the wax and of the dewaxed oil or oil-solvent solution. Other variables remaining constant, the rate of motion of the wax varies inversely as the viscosity of the dewaxed oil or oil-solvent solution and directly as the difference between the specific gravities and the slip coefficient between dewaxed oil or oil-solvent solution and wax. In normal gravity separation, the wax particles are in direct contact with dewaxed oil or oil-solvent solution and the great affinity of wax for oil or oil-solvent solution results in substantially zero slip at the interfaces therebetween. In accordance with the present invention, the dewaxed oil or oil-solvent solution will be in contact, at least to some appreciable extent, with water. Since a large amount of slip is known to take place at oil-water interfaces, a reduction in resistance to motion inevitably follows. Hence, in addition to an increase in the rate of motion caused by an increased difference in specific gravity, the rate of motion is further increased by an increase in the slip coefficient.

In view of the foregoing, it follows, also, that since there is substantially no affinity between oil or oil-solvent and water or aqueous solution, any oil or oil-solvent solution which is separated with the wax product is only such material as is occluded therein. For this reason, it can be removed by washing with water or aqueous solution or solvent thus permitting, theoretically at least, the production of oil-free waxes.

Accordingly, and broadly stated, the present invention provides a process for effecting dewaxing of wax-containing oils and/or deoiling of oil-containing waxes, collectively, wax-oil mixtures, which comprises adding an aqueous solution which is capable of remaining in substantially the liquid state at the dewaxing temperature, to a wax-oil mixture; treating the mixture thus obtained in the presence of a surface active agent to disperse the aqueous solution in the wax-oil mixture; cooling the dispersion to dewaxing temperature to produce a wax-aqueous solution phase; and separating the wax-aqueous solution phase.

From the foregoing, it will become apparent to those skilled in the art that the process contemplated herein may be carried out in accordance with several procedures, all of which, nevertheless, are encompassed by the broad statement of invention set forth hereinbefore. By way of illustration, a preferred specific embodiment of the present invention may be practiced as follows: Referring to the drawing, a primary stream 1 consisting of a wax-oil mixture 2, a low specific gravity solvent 3, and a non-freezing aqueous solution 4 of a surface active agent is heated to a temperature of about 110° F. in a heater 5 and mixed in a mixer 6 in the presence of a recycle stream 7 of wash solvent from the deoiling operation of the process, to produce a dispersion of the aqueous solution in the waxy oil-solvent solution. The dispersion is fed to a chiller 8, for example, a screw chiller, wherein it is cooled to the de-waxing temperature, normally 0° F. The effluent from the chiller 8 comprising precipitated wax attached to the dispersed aqueous solution droplets is then fed to an inlet 9 into the upper section of a tower 10. The aqueous solution droplets with the attached wax move downwardly from the inlet 9 through the tower 10 at a rate of 0.1 to 3.0 feet and higher per minute. Fresh solvent 11 is fed through another chiller 12 to an inlet 13 into the lower portion of the tower 10, whence it flows upwardly through the tower 10 and countercurrent to the downwardly moving aqueous solution droplets with the attached wax, thereby washing the latter to reduce the oil-content of the wax. The wash solvent is removed from the tower 10 at the relatively constricted section thereof 14, just below the inlet 9, and is subsequently employed, as stated hereinbefore, as the recycle stream 7, for diluting the primary stream 1. The aqueous solution droplets with the attached wax collect at the bottom of the tower 10 to produce a wax phase 15 which forms an interface 16 with the remainder of the contents of the tower 10. The dewaxed oil-solvent solution accumulates in the upper portion of the column 10, above the inlet 9. The interface 16 is kept, preferably, at a level below the inlet 13 and the rate of products take off is maintained by an air-operated diaphragm-type level controller 18. The wax phase 15 is removed from the bottom of the tower 10, and is fed to a heater 19, wherein it is heated to a temperature of about 125° F. The effluent from the heater 19 is fed to a settler 20 to separate the wax from the aqueous solution which may be recycled to the process. The wax product may be finished in a conventional manner. The dewaxed oil-solvent solution 17 is removed from the top of the tower 10 and the solvent and oil are separated and recovered in a conventional manner.

Obviously, when employing high specific gravity solvents, the wax phase will collect at the top of the tower. In this case, the wax phase will be removed from the top of the tower, the dewaxed oil-solvent will be removed from the bottom of the tower, and the wash solvent will be similarly drawn from an intermediate level for recycle to the primary stream for dilution purposes.

In general, any wax-containing oil or any oil-containing wax is emenable to the process of the present invention. The charge stock may be either a distillate stock or a residual stock or oily waxes obtained therefrom. Wax-bearing mineral oils, brown coal tar oils, animal oils, shale oils, vegetable oils and synthetically produced oils, any of which may have been previously subjected to a deasphalting treatment or other treatment for the purpose of improving their physical and/or their chemical nature may be mentioned by way of non-limiting examples of materials suitable as charge stocks for the process contemplated herein. There appears to be nothing critical in the amount of wax present in the wax-containing oils or in the amounts of oil present in the oil-containing waxes to be treated. Thus, the wax-content of the charge stocks may vary between about 0.1 per cent and about 99.9 per cent by weight. On the other hand, the amount of wax present in either of the mixtures is largely determinative of the fluidity of the charge to the process.

Accordingly, in practicing the invention, it is usually desirable, although not essential, to increase the fluidity of the charge to the process by the addition of an oil-miscible diluent or solvent. For this purpose, the oil-solvents of the prior art may be used. It has been found that a suitable diluent, in general, should possess the following properties. It should be substantially completely miscible with the stock to be treated, it should be substantially insoluble in and immiscible with water, it should possess, preferably, a low viscosity coefficient, it should not manifest any substantial tendency to emulsify under the conditions of the process, it should be a poor solvent for solid wax at the dewaxing temperature, it must not disturb the adsorption of the molecules of the surface active agent at the solid wax surfaces, it must not affect, to any appreciable extent, the tendency of the surface active agent to adsorb at the solid wax surfaces, and, finally, it should not displace water from the water- or aqueous solution-coated wax surfaces. Hydrocarbons such as propane, butane, pentane, propene, butenes, pentenes, naphtha, gasoline, benzene and kerosene, and trichloroethylene, methylethyl ketone, ethylene dichloride, methyl chloride, carbon tetrachloride, acetone, and mixtures thereof such as methylethyl ketone-benzene mixtures, acetonitrile-benzene mixtures, ethyl carbonate-propane mixtures, may be mentioned by way of non-limiting examples of diluents or solvents suitable for the purposes of the present invention.

There appears to be nothing critical in the amounts of diluent or solvent used. As stated hereinbefore, the primary purpose of the diluent is to increase the fluidity of the charge to the process. Accordingly, the amounts of solvent used may vary between wide limits. Ordinarily, amounts to produce between about 0.5:1 and about 20:1, preferably between about 2:1 and about 4:1, (volume of solvent to volume of charge stock) dilution are employed. The solvent may be added to the oil at any time during the process and may be added in fractions of the total amount to be used over a period of time prior to the final separation step. In practice, the solvent is added usually prior to or during the chilling step.

Generally speaking, the surface active agents utilizable herein are those which are known as such in the prior art. As stated hereinbefore, the surface active agents are characterized by molecules having a hydrophobic group (the non-polar group) and a hydrophilic group (the polar group). The surface activity of the molecules in an aqueous-nonaqueous system (in the broad sense), such as exists in the process of the present invention, is due to the adsorption of the molecules at an interface. In general, it may be stated that the preferred surface active agents applicable herein are those in which the hydrophobic portion of the molecule is hydrocarbon-like in nature, especially those in which the hydrophobic portion approaches in molecular weight that of the wax to be separated, and the hydrophilic portion is a radical selected from the group consisting of —OH, —SO$_3$H, —COOH, —CO, —NH$_2$, —NO$_2$, —N.N—, —N:N.N—, —CSNH, —CONH$_x$, —COO, —COC—, —SO$_4$, PO$_4$≡, —PO$_3$H$_2$, —PO$_2$H, and —SO$_3$M, wherein M is the hydrogen equivalent of a metal. These criteria, therefore, afford the basis for a classification of the various types of surface active agents suitable for the purposes contemplated herein. For convenience, the types may be tabulated as follows:

TABLE I

*Types of surface active agents*

TYPE A

| Group Name | Formula of an Example |
|---|---|
| 1. Fatty acid salt | R—COONa. |
| 2. Dimetal salt of a sulfated fatty acid. | RC$_n$H$_{2n-2}$(SO$_4$Na)COONa. |
| 3. Glyceryl ester of a fatty acid | RCOOCH$_2$CHOHCH$_2$OH. |
| 4. Metal sulfonate of a fatty acid ester. | RCOOCH$_2$CH$_2$SO$_3$Na. |
| 5. Metal sulfonate of a fatty acid amide. | RCONHCH$_2$CH$_2$SO$_3$Na. |
| 6. Fatty acid amide ethyl dialkyl amine. | RCONHCH$_2$CH$_2$NR′R″. |

TABLE I—Continued

TYPE B

| Group Name | Formula of an Example |
|---|---|
| 1. Metal alkyl sulfate | RSO$_4$Na. |
| 2. Metal secondary alkyl sulfate | R$_2$CHSO$_4$Na. |
| 3. Metal bisulfate of dialkyl dicarboxylate. | R′—C(=O)—O—CH$_2$ / R—C(=O)—O—C(—SO$_4$Na)(—H) |

TYPE C

| | |
|---|---|
| 1. Metal alkyl sulfonate | RSO$_3$Na. |
| 2. Metal aryl sulfonate | Aryl SO$_3$Na. |
| 3. Metal alkaryl sulfonate | R′Aryl SO$_3$Na. |

TYPE D

| | |
|---|---|
| Quaternary ammonium halide | [R′R″NR‴R]X |

TYPE E

| | |
|---|---|
| Natural substances | |

Wherein
R, R′, R″ and R‴ are alkyl or alkenyl radicals,
X is a halogen, and
$n$ is a whole number.

A number of surface active agents were tested in accordance with the procedure set forth in the specific embodiment described hereinbefore, and were found to be effective in the operation of the process. For convenience, these materials are tabulated in Table II.

TABLE II

*Effective surface active agents*

| | Chemical Name or Formula | Trade Name |
|---|---|---|
| 1. | (CH$_3$)$_2$CH—[decalin]—OSO$_3$Na, with CH—(CH$_3$)$_2$ | Nekal A. |
| 2. | CH$_2$CH(CH$_3$)$_2$—[decalin]—OSO$_3$Na, with CH$_2$CH(CH$_3$)$_2$ | Nekal B. |
| 3. | C$_{14}$H$_{29}$SO$_4$Na | Tergitol 4. |
| 4. | C$_{17}$H$_{34}$SO$_4$Na | Tergitol 7. |
| 5. | Sodium wax phenol sulfonate | |
| 6. | Sorbitan monostearate* | Span 60. |
| 7. | C$_{12}$H$_{25}$C$_6$H$_3$(OH)SO$_3$Na | |
| 8. | C$_9$H$_{19}$C$_6$H$_3$(OH)SO$_3$Na | |
| 9. | (C$_{18}$H$_{37}$)$_3$C$_6$H(OH)SO$_3$Na | |
| 10. | (C$_{18}$H$_{37}$)$_2$P(=O)OH | |
| 11. | (C$_{18}$H$_{37}$)$_2$P(=O)ONa | |

*Footnote at end of table.

TABLE II—Continued

| Chemical Name or Formula | Trade Name |
|---|---|
| 12. 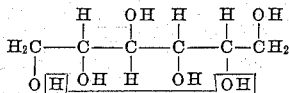 | |
| 13. 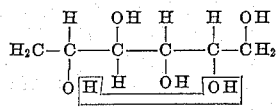 | |

*Sorbitan is derived from the dehydration of sorbitol:

$$H_2C\!-\!\underset{|}{\overset{H}{C}}\!-\!\underset{OH}{\overset{H}{C}}\!-\!\underset{H}{\overset{H}{C}}\!-\!\underset{OH}{\overset{H}{C}}\!-\!CH_2$$
$$\phantom{H_2C\!-\!}O\,\boxed{H\,|\,OH\quad H\quad\;OH\;\,|\,OH}$$

to cause ring closure through an ether linkage to produce a six member ring, or $$H_2C\!-\!\underset{|}{\overset{H}{C}}\!-\!\underset{OH}{\overset{H}{C}}\!-\!\underset{H}{\overset{H}{C}}\!-\!\underset{OH}{\overset{H}{C}}\!-\!CH_2$$
$$\phantom{H_2C-}O\,\boxed{H\,|\,H\quad\;OH\;\,|\,OH}$$

to cause ring closure through an ether linkage to produce a five-member ring.

The surface active agents enumerated in Table II are illustrative of specific surface active agents operable in the process of the present invention. Alkali metal wax aromatic sulfonates or alkali metal wax oxyaromatic sulfonates are typical of one of the preferred classes of surface active agents to be used herein and in order to furnish the criteria to be applied in the selection of a surface active agent which will give optimum results with a given charge stock, further discussion of surface active agents utilizable herein will be had in conjunction with this class.

Materials known as wax phenol sodium sulfonate, for example, may be prepared, as is well known in the art, in accordance with the following procedure (U. S. patent to Reiff et al., No. 2,252,666): A paraffin wax melting at about 120° F. and predominantly comprised of compounds having at least 20 carbon atoms per molecule is chlorinated by heating to about 200° F. and bubbling chlorine therethrough until the chlorwax obtained contains from about 10 per cent to about 21 per cent by weight of chlorine. The chlorwax is then condensed with phenol, at a temperature of about 350° F. and in the presence of about 4 per cent to about 10 per cent by weight of an aluminum chloride Friedel-Crafts catalyst, to produce wax-substituted phenol. This product is treated with chlorsulfonic acid in amounts, on a weight basis, of about 100–175 per cent of theoretical, in a conventional sulfonation operation, at a temperature of about 125–200° F., and the product thus obtained is neutralized with sodium hydroxide in amounts, on a weight basis, of about 120–150 per cent of theoretical, at a temperature of about 150° F.

In general, the structure of the materials known as wax phenol metal sulfonates is visualized to be as follows:

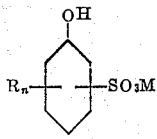

wherein R may be wax or other hydrocarbon radical of comparable chain length, M is the hydrogen equivalent of a metal, and $n$ is 1 to 3. The wax groups may be derived from a fraction of a viscous mineral oil ranging in molecular weight from that of a light wax distillate to a heavy residuum.

Materials known as wax phenol (1–14) sodium sulfonate are a good example of a surface active agent useful in the process of the present invention. With respect to the connotation (1–14), the first number indicates the theoretical degree of alkylation, i. e., the atomic proportions of chlorine in the chlorwax which is reacted with one mol of the hydroxy aromatic compound, and the second number indicates the weight per cent of chlorine in the chlorwax. The wax phenol (1–14) sodium sulfonate actually is a mixture of the mono-wax phenol sulfonate, the diwax phenol sulfonate, and of some poly-wax phenol sulfonates.

The test for determining whether a surface active agent will be operable or not in the process of the present invention is the bubble machine test [see Engineering and Mining Journal, 137, 291 (1936)] equipped with a cold stage. In this test, a piece of wax of the type to be removed and having at least one relatively flat surface is immersed in the oil-wax or oil-wax-solvent mixture to be dewaxed containing 0.1 per cent by weight of the surface active agent to be tested. The system is then cooled to the dewaxing temperature. A droplet of non-freezing aqueous solution containing 0.1 per cent by weight of the surface active agent to be tested, is placed in a bubble holder and the droplet is then permitted to come into contact with the wax surface. If a finite three-phase (from wax through oil or oil-solvent to the non-freezing aqueous solution) contact angle can be measured, the surface active agent being tested will be operable in the process of the present invention. The larger the three-phase contact angle, the more effectual the surface active agent will be in the process. Therefore, if the non-freezing aqueous solution spreads over the entire flat wax surface (contact angle=180°), the surface active agent being tested will be very effectual. Accordingly, the surface active agents operable herein can be defined as those which produce a finite three-phase contact angle in the bubble machine test at the dewaxing temperature.

Using the bubble machine test, a number of surface active agents were tested with the following results:

TABLE III

[Non-freezing aqueous solution=60% water+40% ethylene glycol; Oil solvent=52% benzol, 40% methyl-ethyl ketone and 8% toluol.]

| Surface Active Agent | Three-Phase Contact Angle, Degrees | |
|---|---|---|
| | Paraffin Wax | Microcrystalline Wax |
| Sodium Wax Phenol (1–14) Sulfonate | 17 | 17 |
| Tergitol 7 | 22 | <10 |
| Tergitol 4 | 22 | <10 |
| Span 60 | 50 | 50 |
| Nekal A | 43 | <10 |
| Nekal B | 47 | <10 |
| $C_{12}H_{25}C_6H_3(OH)SO_3Na$ | 36 | <10 |
| $C_9H_{19}C_6H_3(OH)SO_3Na$ | 24 | <10 |
| $(C_{18}H_{37})_3C_6H(OH)SO_3Na$ | 24 | <10 |
| $(C_{18}H_{37})_2PO_2H$ | 60 | <10 |
| $[CH_3CHC_2H_5(CH_2)_4]_2PO_2H$ | 30 | <10 |

The amounts of surface active agent to be used may vary between wide limits. Ordinarily, excessive amounts are to be avoided since it has been found that they effect emulsification of the oil or oil-solvent mixture in the non-freezing aqueous solution. On the other hand, the use of insufficient amounts will result in an incomplete separation of the wax. In general, the amounts of surface active agent to be used depend upon the amount of wax present in the stock undergoing treatment. Obviously, the optimum amounts to be utilized in any given instance can be readily determined by those skilled in the art by a few preliminary tests. In practicing the invention, it has been found that amounts varying between about 0.01 per cent and about 10 per cent, preferably, between about 0.3 per cent and about 3 per cent, based on the weight of the wax-containing oil or oil-containing wax in the charge will produce satisfactory results.

The surface active agent is ordinarily added to the charge as a solution in water. In conformance with the mechanism of operation postulated hereinbefore, the water is an essential factor in the successful operation of the process of the present invention, the wax surfaces becoming at least partially covered with water or aqueous solution. The amounts to be used depend upon the amount of wax present in the stock undergoing treatment. Obviously, the optimum amounts to be utilized in any given instance can be readily determined by those skilled in the art by a few preliminary tests. In practice, it has been found that amounts varying between about 1 per cent and about 200 per cent, preferably between about 25 per cent and about 75 per cent, based on the weight of the wax-containing oil or oil-containing wax in the charge will produce satisfactory results.

Also in accordance with the modus operandi of the process of the present invention, it is likewise essential that the water remain in the liquid state at the dewaxing temperatures utilized. Accordingly, various substances are added to the water to lower its freezing point to a temperature below that at which dewaxing is effected. These substances, preferably, should be substantially completely soluble in and miscible with water, they should not manifest any substantial tendency to emulsify under the conditions of the process, they should be poor solvents for solid wax at the dewaxing temperatures, they must not disturb the adsorption of the molecules of the surface active agent at the solid wax surfaces, and, finally, they must not affect, to any appreciable extent, the tendency of the surface active agent to concentrate at the solid wax surfaces. Ethylene glycol, sodium chloride, colloidal silica, and glycerine may be mentioned by way of non-limiting examples of substances adapted to produce non-freezing aqueous solutions utilizable in the process contemplated herein.

The amounts of these substances to be employed, obviously, will depend on the amount of water being utilized, and on the type of material being used for such purposes. As will be appreciated by those skilled in the art, the amounts to be used in any particular case can be readily determined by a few preliminary tests once the dewaxing temperature to be applied has been established, the criteria applicable being, as stated hereinbefore, to maintain the water solution in the liquid state at dewaxing temperatures.

In this connection, it must be noted that when substances such as, for example, sodium chloride, potassium chloride or sodium carbonate, are employed to produce a non-freezing aqueous solution of surface active agent, the dispersion of aqueous solution droplets with the attached wax has the appearance of sand. This type of dispersion is conducive to more effective solvent deoiling.

Agitation is necessary to effect dispersion of the non-freezing aqueous solution in the wax-bearing oil and to ensure collision between the dispersed aqueous solution droplets and wax particles during and after chilling. In general, more violent agitation is desirable when processing distillate stocks.

In order to facilitate the dispersion of the non-freezing aqueous solution in the wax-oil mixture during the initial stages of the process and, also, to ensure that the wax-oil mixture or wax-oil-solvent mixture constitutes a homogeneous liquid phase at the beginning of the treatment, it is ordinarily preferred to heat the mixture to temperatures varying between about 100° F. and about 200° F. during the dispersion operation. The temperature to be utilized to produce optimum results will depend upon the nature of the stock undergoing treatment.

The dewaxing temperatures applicable in the process are those of the prior art, i. e., between about —40° F. and about 100° F. It must be recognized, of course, that the dewaxing temperature applicable in any particular instance will depend upon the nature of the system, i. e., the surface active agent utilized, the type of aqueous solution, the type of dewaxing solvent, etc.

The rate at which the temperature of the mixture is lowered to dewaxing temperature (the chilling rate) is not a critical factor, although, as it will be appreciated by those skilled in the art, an important factor. The chilling rate, as is well known, is determinative of the size of the wax crystals that precipitate out during the chilling operation. For general purposes, it has been found that an average chilling rate of about 10° F. per hour to about 500° F. per hour is conducive to optimum results. In general, the higher chilling rates are preferred when processing distillate stocks while the lower chilling rates are employed preferably when treating residual stocks.

Although the foregoing discussion has indicated a preferred sequence of the addition of the various components to the system and of the manipulations involved in the process, it must be clearly understood that departures from them may be made. For example, the wax-oil mixtures, the oil solvent, and the non-freezing aqueous solution of surface active agent, may be separately chilled and then mixed at any temperature down to the dewaxing temperature. Finally, instead of a tower, tanks, filters, centrifuges and the like can be used to effect the separation of the water- or aqueous solution-wetted wax particles or crystals from the oil or oil-solvent mixtures. It will be apparent also that the process may be operated as a batch or discontinuous process or as a continuous process. Moreover, in many cases, it will be found to be advantageous to carry out the operation in stages. For example, the dewaxing may be effected at decreasingly lower dewaxing temperatures, down to the final dewaxing temperature, the operation contemplated herein being carried out in each stage with the "dewaxed" product of each stage constituting the charge stock for the subsequent stage.

The following examples are for the purpose of illustrating modes of carrying out the process of the present invention and to point out the advantages thereof, it being understood that the invention is not to be considered as being limited to the specific stocks, surface active agents, oil solvents and aqueous solutions or to the manipulations, apparatuses, and conditions set forth therein. As it will be apparent to those skilled in the art, a wide variety of stocks, surface active agents, oil solvents and aqueous solutions and a diversity of apparatuses, manipulations and conditions, as described hereinbefore, may be employed to carry out the dewaxing or deoiling operation.

EXAMPLES 1 THROUGH 4

In each of the following runs, a solvent-refined Mid-Continent-type residual oil having a Saybolt Universal viscosity of 95 seconds at 210° F. was refluxed with a solvent at a temperature of 100–126° F., and then, where indicated, a non-freezing aqueous solution or a non-freezing aqueous solution of a surface active agent was added to the mixture. The mixture thus obtained was chilled to a temperature of 0° F. at various rates while under mild agitation. The chilled mixture was then placed in a cylinder and the separation rate of the wax from the liquid thus measured. For convenience, the pertinent data and the results obtained in each run are set forth in Table IV.

Thus, as shown in Example 1, when the process is operated without the use of a non-freezing aqueous solution of a surface active agent, the separation rate is very low. Also, as shown in Example 2, when the process is operated without the use of a surface active agent, the separation rate likewise is very low. On the other hand, as shown in Examples 3 and 4, when a non-freezing aqueous solution of a surface active agent is used, the separation rates are 0.7 and 1.36 feet per minute.

EXAMPLE 5

In order to show that the process of the present invention is applicable to the treatment of distillate stocks, the run of Example 4 was repeated except that a Mid-Continent-type wax distillate having a Saybolt Universal viscosity of 36 seconds at 210° F. was used instead of the residual oil. A settling rate of 1.6 feet per minute, a wax containing 34 per cent by weight of oil, and an oil having a pour point of 25° F. were obtained.

EXAMPLES 6 THROUGH 11

The procedure of Example 3 was repeated in

TABLE IV

*To show the effect of surface active agents*

| Example No. | 1 | 2 | 3 | 4 |
|---|---|---|---|---|
| Solvent, Percent by Volume | 65% Ethylene Dichloride, 35% Trichloro Ethylene | 65% Ethylene Dichloride, 35% Trichloro Ethylene | 65% Ethylene Dichloride, 35% Trichloro Ethylene | 50% Benzol, 40% Methyl ethyl Ketone, 10% Toluol. |
| Dilution Ratio: Volume of Solvent to Volume of Charge Stock | 6:1 | 6:1 | 6:1 | 3:1. |
| Non-Freezing Aqueous Solution, Percent Vol. | | 35% Ethylene Glycol, 65% Water | 35% Ethylene Glycol, 65% Water | 35% Ethylene Glycol. 65% Water. |
| Volume of Non-Freezing Aqueous Solution to Volume of Charge Stock | | 0.5:1 | 0.5:1 | 0.75:1. |
| Surface Active Agent | | | (1-14) Wax phenol Sodium Sulfonate. | (1-14) Wax phenol Sodium Sulfonate. |
| Percent by Weight of Charge Stock | | | 1.0 | 2.5. |
| Chilling Rate, °F. per Hour | 10 | 10 | 10 | 300. |
| Wax Settling Rate, Feet per Minute | 0.04 | 0.057 | 0.7 | 1.36. |
| Inspection of Products: Wax, Oil-Content, Percent by Weight | | | 10.4 | 32.9. |
| Oil, Pour Point, °F | | | 20 | 20. |

From these data, it will be seen that the use of a non-freezing aqueous solution of a surface active agent is essential to the successful operation of the process of the present invention.

each of the following runs with the exception that the surface active agent and the charge stock were different in each instance. For convenience, the data are set forth in Table V.

TABLE V

| Example No. | Surface Active Agent | | Settling Rate, Feet Per Minute |
|---|---|---|---|
| | Name | Formula | |
| 6¹ | 1-10 Wax Benzene Sodium Sulfonate. | 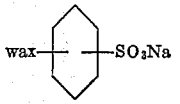 | 0.27 |
| 7¹ | 3-10 Wax Beta Naphthol Sodium Sulfonate. | 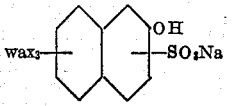 | 0.7 |
| 8¹ | 3-10 Wax Phenoxy Ethanol Sodium Sulfonate. | 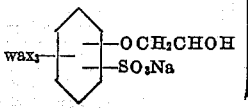 | 0.65 |

TABLE V—Continued

| Example No. | Surface Active Agent | | Settling Rate, Fee Per Minute |
|---|---|---|---|
| | Name | Formula | |
| 9 [2] | 1-14 Wax Catechol Sodium Sulfonate. | wax—⟨OH, OH, SO₃Na, Cl⟩ | 0.6 |
| 10 [2] | 1-14 Wax Chlorophenol Sodium Sulfonate. | wax—⟨OH, SO₃Na⟩ | 2.5 |
| 11 [2] | 1-14 Wax Cresol Sodium Sulfonate. | wax—⟨CH₃, OH, SO₃Na⟩ | 4.0 |

[1] Residuum having a Saybolt Universal viscosity of 90 seconds at 210° F.
[2] Wax distillate having a Saybolt Universal viscosity of 36 seconds at 210° F.

It will be seen that commercially feasible wax separation rates can be obtained using a wide variety of surface active agents. Each of these surface active agents produces a finite three-phase contact angle in the bubble machine test at dewaxing temperatures.

EXAMPLE 12

In order to show that inorganic compounds may be used for producing non-freezing aqueous solutions, the run set forth in Example 3 was repeated except that the non-freezing aqueous solution was a 23 per cent solution of sodium chloride in water. A settling rate of 0.3 feet per minute, a wax-containing 43.2 per cent by weight of oil, and an oil having a pour point of 30° F. were obtained.

EXAMPLES 13, 14, AND 15

These three examples demonstrate the commercial feasibility of the process of the present invention. The three runs were made in the plant illustrated diagrammatically in the drawing and discussed in detail hereinbefore. The pertinent data and the results obtained are set forth in Table VI.

In view of the foregoing, it will be appreciated by those skilled in the art that surface active agents operable in the process contemplated herein may be present in, or, may be introduced into, the system through the wax-oil mixture, through the solvent, or, possibly, through the substances utilized for maintaining the water in substantially the liquid state at the dewaxing temperature. These contingencies can be readily established through a bubble machine test carried out in the absence of an added surface active agent. Accordingly, it must be clearly understood that when in the specification and in the claims hereof, the presence of a surface active agent is referred to, either the introduction of a surface active agent into the system through these contingencies or the actual addition of a surface active agent to the system, or both, will be intended.

It will be apparent from the foregoing that the present invention provides an efficient, economical, and relatively simple process for effecting gravity separation of wax or oil from wax-oil mixtures. It will be appreciated by those skilled in the art that the present invention may

TABLE VI

| Example No | 13 | 14 | 15 |
|---|---|---|---|
| Charge Stock | Mid-Continent-Type Wax Distillate, S. U. V.-36" @ 210° F. | Solvent Refined Mid-Continent-Type Residual Oil. | Crude Scale Wax, 2% Wt. Oil, M. P. 120.5° F. |
| Solvent, Percent Vol | 40% Methyl Ethyl Ketone + 50% Benzol + 10% Toluol. | 40% Methyl Ethyl Ketone + 50% Benzol + 10% Toluol. | 40% Methyl Ethyl Ketone + 50% Benzol + 10% Toluol. |
| Non-Freezing Aqueous, Solution by Volume. | 60% Water + 40% Ethylene Glycol. | 60% Water + 40% Ethylene Glycol. | 60% Water + 40% Ethylene Glycol. |
| Surface Active Agent | (1-14) Wax Phenol Sodium Sulfonate [1]. | (1-14) Wax Phenol Sodium Sulfonate [1]. | (1-14) Wax Phenol Sodium Sulfonate [1]. |
| Surface Active Agent, Solution, Percent Wt | 97.15% Non-Freezing Aqueous Solution + 2.6% (1-14) Wax Phenol Sodium Sulfonate [1] + 0.25% NaCl. | 97.8% Non-Freezing Aqueous Solution + 2.2% (1-14) Wax Phenol Sodium Sulfonate [2]. | 88.9% Non-Freezing Aqueous Solution + 2.3% (1-14) Wax Phenol Sodium Sulfonate [1] + 8.8% NaCl. |
| Charge, Volume: | | | |
|   Charge Stock | 1.00 | 1.00 | 1.00. |
| Solvent: | | | |
|   Primary | 1.00 | 0 | 4.00. |
|   Wash | 2.00 | 3.5 | 1.90 (Discarded). |
|   Overall | 3.00 | 3.5 | 4.00. |
| Surface Active Agent Solution | 0.73 | 0.75 | 0.75. |
| Dewaxing Temperature | 0° F | 0° F | 0° F. |
| Inspections: | | | |
|   Oil, Pour Point | 15° F | 15° F | |
|   Wax, Percent Wt. Oil | 4.7 | | 0.32. |
|   Petrolatum, Percent Wt. Oil | | 8.5 | |

[1] Wax phenol sulfonate derived from scale wax.
[2] Wax phenol sulfonate derived from low-melting point fraction of petrolatum.

be embodied in other specific forms without departing from the spirit or essential attributes thereof. Accordingly, it must be clearly understood that the present embodiments be considered in all respects illustrative and not restrictive, reference being had to the appended claims rather than to the foregoing description to indicate the scope of the invention.

What is claimed is:

1. A process for separating wax and oil from a wax-oil mixture, which comprises adding an aqueous solution, which is capable of remaining in substantially the liquid state at the dewaxing temperature, to said wax-oil mixture, in an amount varying between about one per cent and about 200 per cent, based on the weight of the wax-oil mixture, to produce an aqueous solution-wax-oil mixture; treating said aqueous solution-wax-oil mixture, in the presence of a surface active agent that produces a finite three-phase contact angle in the bubble machine test at the dewaxing temperature, in amounts of at least about 0.01 per cent, based on the weight of the wax-oil mixture, but less than the amount necessary to promote formation of a wax-oil mixture-in-aqueous solution emulsion in which the aqueous solution is the continuous phase, to produce a dispersion in which the aqueous solution is the dispersed phase and the wax-oil mixture is the continuous phase, and to associate wax with said dispersed phase, thereby producing a dispersed wax-aqueous solution phase, said dispersion being maintained at the dewaxing temperature, whereby wax is present in the solid state; and separating said dispersed wax-aqueous solution phase from said dispersion.

2. A process for separating wax and oil from a wax-oil mixture, which comprises adding an aqueous solution, which is capable of remaining in substantially the liquid state at the dewaxing temperature, to said wax-oil mixture, in an amount varying between about one per cent and about 200 per cent, based on the weight of the wax-oil mixture, to produce an aqueous solution-wax-oil mixture; treating said aqueous solution-wax-oil mixture, in the presence of a surface active agent that produces a finite three-phase contact angle in the bubble machine test at the dewaxing temperature, in amounts of at least about 0.01 per cent, based on the weight of the wax-oil mixture, but less than the amount necessary to promote formation of a wax-oil mixture-in-aqueous solution emulsion in which the aqueous solution is the continuous phase, to produce a dispersion in which the aqueous solution is the dispersed phase and the wax-oil mixture is the continuous phase; cooling said dispersion to the dewaxing temperature to precipitate wax; continuing said treating to associate wax with said dispersed phase and to produce a dispersed wax-aqueous solution phase; and separating said dispersed wax-aqueous solution phase from said dispersion.

3. A process for separating wax and oil from a wax-oil mixture, which comprises adding a solvent to said wax-oil mixture to produce a solvent-wax-oil mixture; adding an aqueous solution, which is capable of remaining in substantially the liquid state at the dewaxing temperature, to said solvent-wax-oil mixture, in an amount varying between about one per cent and about 200 per cent, based on the weight of the wax-oil mixture, to produce an aqueous solution-solvent-wax-oil mixture; treating said aqueous solution-solvent-wax-oil mixture, in the presence of a surface active agent that produces a finite three-phase contact angle in the bubble machine test at the dewaxing temperature, in amounts of at least about 0.01 per cent, based on the weight of the wax-oil mixture, but less than the amount necessary to promote formation of a solvent-wax-oil mixture-in-aqueous solution emulsion in which the aqueous solution is the continuous phase, to produce a dispersion in which the aqueous solution is the dispersed phase and the solvent-wax-oil mixture is the continuous phase; cooling said dispersion to the dewaxing temperature to precipitate wax; continuing said treating to associate wax with said dispersed phase and to produce a dispersed wax-aqueous solution phase; and separating said dispersed wax-aqueous solution phase from said dispersion.

4. A process for separating wax and oil from a wax-oil mixture, which comprises cooling said wax-oil mixture to the dewaxing temperature to precipitate wax; cooling an aqueous solution which is capable of remaining in substantially the liquid state at the dewaxing temperature to the dewaxing temperature; adding said aqueous solution to said wax-oil mixture, at the dewaxing temperature, in an amount varying between about one per cent and about 200 per cent, based on the weight of the wax-oil mixture, to produce an aqueous solution-wax-oil mixture; treating said aqueous solution-wax-oil mixture at the dewaxing temperature, in the presence of a surface active agent that produces a finite three-phase contact angle in the bubble machine test at the dewaxing temperature, in amounts of at least about 0.01 per cent, based on the weight of the wax-oil mixture, but less than the amount necessary to promote formation of a wax-oil mixture-in-aqueous solution emulsion in which the aqueous solution is the continuous phase, to produce a dispersion in which the aqueous solution is the dispersed phase and the wax-oil mixture is the continuous phase, and to associate wax with said dispersed phase, thereby producing a dispersed wax-aqueous solution phase; and separating said dispersed wax-aqueous solution phase from said dispersion.

5. A process for separating wax and oil from a wax-oil mixture, which comprises adding a solvent to said wax-oil mixture to produce a solvent-wax-oil mixture; cooling said solvent-wax-oil mixture to the dewaxing temperature to precipitate wax; cooling an aqueous solution which is capable of remaining in substantially the liquid state at the dewaxing temperature to the dewaxing temperature; adding said aqueous solution to said solvent-wax-oil mixture, at the dewaxing temperature, in an amount varying between about one per cent and about 200 per cent, based on the weight of the wax-oil mixture, to produce an aqueous solution-solvent-wax-oil mixture; treating said aqueous solution-solvent-wax-oil mixture at the dewaxing temperature, in the presence of a surface active agent that produces a finite three-phase contact angle in the bubble machine test at the dewaxing temperature, in amounts of at least about 0.01 per cent, based on the weight of the wax-oil mixture, but less than the amount necessary to promote formation of a solvent-wax-oil mixture-in-aqueous solution emulsion in which the aqueous solution is the continuous phase, to produce a dispersion in which the aqueous solution is the dispersed phase and the solvent-wax-oil mixture is the continuous phase, and to associate wax with said dispersed phase, thereby producing a dispersed wax-aqueous solution phase; and separating said dispersed wax-aqueous solution phase from said dispersion.

6. A process for separating wax and oil from a wax-oil mixture, which comprises adding a solvent to said wax-oil mixture in an amount to produce a solvent-wax-oil mixture in which the solvent to wax-oil mixture volume ratio varies between about 0.5:1 and about 20:1; adding an aqueous solution, which is capable of remaining in substantially the liquid state at the dewaxing temperature, to said solvent-wax-oil mixture, in an amount varying between about one per cent and about 200 per cent, based on the weight of the wax-oil mixture, to produce an aqueous solution-solvent-wax-oil mixture; agitating said aqueous solution-solvent-wax-oil mixture, in the presence of a surface active agent that produces a finite three-phase contact angle in the bubble machine test at the dewaxing temperature, in amounts of at least about 0.01 per cent, based on the weight of the wax-oil mixture, but less than the amount necessary to promote formation of a solvent-wax-oil mixture-in-aqueous solution emulsion in which the aqueous solution is the continuous phase, to produce a dispersion in which the aqueous solution is the dispersed phase and the solvent-wax-oil mixture is the continuous phase; cooling said dispersion to the dewaxing temperature to precipitate wax; continuing said agitating to associate wax with said dispersed phase and to produce a dispersed wax-aqueous solution phase; and separating said dispersed wax-aqueous solution phase from said dispersion.

7. A process for separating wax and oil from a wax-oil mixture, which comprises adding a solvent to said wax-oil mixture in an amount to produce a solvent-wax-oil mixture in which the solvent to wax-oil mixture volume ratio varies between about 0.5:1 and about 20:1; cooling said solvent-wax-oil mixture to the dewaxing temperature to precipitate wax; cooling an aqueous solution which is capable of remaining in substantially the liquid state at the dewaxing temperature to the dewaxing temperature; adding said aqueous solution to said solvent-wax-oil mixture, at the dewaxing temperature, in an amount varying between about one per cent and about 200 per cent, based on the weight of the wax-oil mixture, to produce an aqueous solution-solvent-wax-oil mixture; agitating said aqueous solution-solvent-wax-oil mixture at the dewaxing temperature, in the presence of a surface active agent that produces a finite three-phase contact angle in the bubble machine test at the dewaxing temperature, in amounts of at least about 0.01 per cent, based on the weight of the wax-oil mixture, but less than the amount necessary to promote formation of a solvent-wax-oil mixture-in-aqueous solution emulsion in which the aqueous solution is the continuous phase, to produce a dispersion in which the aqueous solution is the dispersed phase and the solvent-wax-oil mixture is the continuous phase, and to associate wax with said dispersed phase, thereby producing a dispersed wax-aqueous solution phase; and separating said dispersed wax-aqueous solution phase from said dispersion.

8. A process for separating wax and oil from a wax-oil mixture, which comprises adding a solvent to said wax-oil mixture to produce a solvent-wax-oil mixture; adding an aqueous solution, which is capable of remaining in substantially the liquid state at the dewaxing temperature, to said solvent-wax-oil mixture, in an amount varying between about one per cent and about 200 per cent, based on the weight of the wax-oil mixture, to produce an aqueous solution-solvent-wax-oil mixture; agitating said aqueous solution-solvent-wax-oil mixture, in the presence of an alkyl-substituted aryl sodium sulfonate that produces a finite three-phase contact angle in the bubble machine test at the dewaxing temperature, in amounts of at least about 0.01 per cent, based on the weight of the wax-oil mixture, but less than the amount necessary to promote formation of a solvent-wax-oil mixture-in-aqueous solution emulsion in which the aqueous solution is the continuous phase, to produce a dispersion in which the aqueous solution is the dispersed phase and the solvent-wax-oil mixture is the continuous phase; cooling said dispersion to the dewaxing temperature to precipitate wax; continuing said agitating to associate wax with said dispersed phase and to produce a dispersed wax-aqueous solution phase; and separating said dispersed wax-aqueous solution phase from said dispersion.

9. A process for separating wax and oil from a wax-oil mixture, which comprises adding a solvent to said wax-oil mixture to produce a solvent-wax-oil mixture; cooling said solvent-wax-oil mixture to the dewaxing temperature to precipitate wax; cooling an aqueous solution which is capable of remaining in substantially the liquid state at the dewaxing temperature to the dewaxing temperature; adding said aqueous solution to said solvent-wax-oil mixture, at the dewaxing temperature, in an amount varying between about one per cent and about 200 per cent, based on the weight of the wax-oil mixture, to produce an aqueous solution-solvent-wax-oil mixture; agitating said aqueous solution-solvent-wax-oil mixture at the dewaxing temperature, in the presence of an alkyl-substituted aryl sodium sulfonate that produces a finite three-phase contact angle in the bubble machine test at the dewaxing temperature, in amounts of at least about 0.01 per cent, based on the weight of the wax-oil mixture, but less than the amount necessary to promote formation of a solvent-wax-oil mixture-in-aqueous solution emulsion in which the aqueous solution is the continuous phase, to produce a dispersion in which the aqueous solution is the dispersed phase and the solvent-wax-oil mixture is the continuous phase, and to associate wax with said dispersed phase, thereby producing a dispersed wax-aqueous solution phase; and separating said dispersed wax-aqueous solution phase from said dispersion.

10. A process for separating wax and oil from a wax-oil mixture, which comprises adding a solvent to said wax-oil mixture to produce a solvent-wax-oil mixture; adding an aqueous solution, which is capable of remaining in substantially the liquid state at the dewaxing temperature, to said solvent-wax-oil mixture, in an amount varying between about 25 per cent and about 75 per cent, based on the weight of the wax-oil mixture, to produce an aqueous solution-solvent-wax-oil mixture; agitating said aqueous solution-solvent-wax-oil mixture, in the presence of a wax phenol (1–14) sodium sulfonate in amounts varying between about 0.3 per cent and about three per cent, based on the weight of the wax-oil mixture, to produce a dispersion in which the aqueous solution is the dispersed phase and the solvent-wax-oil mixture is the continuous phase; cooling said dispersion to the dewaxing temperature to precipitate wax; continuing said agitating to associate wax with said dispersed phase and to produce a dispersed wax-aqueous solution phase; and separating said dispersed wax-aqueous solution phase from said dispersion.

11. A process for separating wax and oil from a wax-oil mixture, which comprises adding a solvent to said wax-oil mixture to produce a solvent-wax-oil mixture; cooling said solvent-wax-oil mixture to the dewaxing temperature to precipitate wax; cooling an aqueous solution which is capable of remaining in substantially the liquid state at the dewaxing temperature to the dewaxing temperature; adding said aqueous solution to said solvent-wax-oil mixture, at the dewaxing temperature, in an amount varying between about 25 per cent and about 75 per cent, based on the weight of the wax-oil mixture, to produce an aqueous solution-solvent-wax-oil mixture; agitating said aqueous solution-solvent-wax-oil mixture at the dewaxing temperature, in the presence of a wax phenol (1-14) sodium sulfonate in amounts varying between about 0.3 per cent and about three per cent, based on the weight of the wax-oil mixture, to produce a dispersion in which the aqueous solution is the dispersed phase and the solvent-wax-oil mixture is the continuous phase, and to associate wax with said dispersed phase, thereby producing a dispersed wax-aqueous solution phase; and separating said dispersed wax-aqueous solution phase from said dispersion.

12. A process for separating wax and oil from a wax-oil mixture, which comprises adding a solvent to said wax-oil mixture to produce a solvent-wax-oil mixture; adding an aqueous solution, which is capable of remaining in substantially the liquid state at the dewaxing temperature, to said solvent-wax-oil mixture, in an amount varying between about 25 per cent and about 75 per cent, based on the weight of the wax-oil mixture, to produce an aqueous solution-solvent-wax-oil mixture; agitating said aqueous solution-solvent-wax-oil mixture, in the presence of sorbitan monostearate in amounts varying between about 0.3 per cent and about three per cent, based on the weight of the wax-oil mixture, to produce a dispersion in which the aqueous solution is the dispersed phase and the solvent-wax-oil mixture is the continuous phase; cooling said dispersion to the dewaxing temperature to precipitate wax; continuing said agitating to associate wax with said dispersed phase and to produce a dispersed wax-aqueous solution phase; and separating said dispersed wax-aqueous solution phase from said dispersion.

13. A process for separating wax and oil from a wax-oil mixture, which comprises adding a solvent to said wax-oil mixture to produce a solvent-wax-oil mixture; cooling said solvent-wax-oil mixture to the dewaxing temperature to precipitate wax; cooling an aqueous solution which is capable of remaining in substantially the liquid state at the dewaxing temperature to the dewaxing temperature; adding said aqueous solution to said solvent-wax-oil mixture, at the dewaxing temperature, in an amount varying between about 25 per cent and about 75 per cent, based on the weight of the wax-oil mixture, to produce an aqueous solution-solvent-wax-oil mixture; agitating said aqueous solution-solvent-wax-oil mixture at the dewaxing temperature, in the presence of sorbitan monostearate in amounts varying between at least about 0.3 per cent and about three per cent, based on the weight of the wax-oil mixture, to produce a dispersion in which the aqueous solution is the dispersed phase and the solvent-wax-oil mixture is the continuous phase, and to associate wax with said dispersed phase, thereby producing a dispersed wax-aqueous solution phase; and separating said dispersed wax-aqueous solution phase from said dispersion.

HAROLD C. MYERS.
ARNOLD O. PUKKILA.
THEODOR A. PETRY.

References Cited in the file of this patent

UNITED STATES PATENTS

| Number | Name | Date |
|---|---|---|
| 2,153,895 | McKittrick et al. | Apr. 11, 1939 |
| 2,161,581 | Knowles | June 6, 1939 |
| 2,164,013 | Jenkins | June 27, 1939 |
| 2,168,306 | Schutte | Aug. 1, 1939 |
| 2,263,535 | Carr et al. | Nov. 18, 1941 |